United States Patent [19]

Ford, Jr.

[11] E Patent Number: Re. 33,564

[45] Reissued Date of Patent: Apr. 2, 1991

[54] FOAM DISPENSING DEVICE

[75] Inventor: George W. Ford, Jr., Salt Lake City, Utah

[73] Assignee: Ballard Medical Products, Midvale, Utah

[21] Appl. No.: 812,672

[22] Filed: Dec. 23, 1985

Related U.S. Patent Documents

Reissue of:

[64] Patent No.: 4,531,660
Issued: Jul. 30, 1985
Appl. No.: 614,704
Filed: May 29, 1984

U.S. Applications:

[63] Continuation of Ser. No. 330,254, Dec. 14, 1981, abandoned.

[51] Int. Cl.[5] ..... B65D 37/00

[52] U.S. Cl. ..... 222/209; 222/373; 222/401; 222/207

[58] Field of Search ..... 222/209, 211, 401, 207, 222/189, 190, 212, 213, 373, 206

[56] References Cited

U.S. PATENT DOCUMENTS

| | | | |
|---|---|---|---|
| 296,435 | 4/1884 | Murdock | 222/209 |
| 1,792,513 | 2/1931 | Soreny | 222/173 |
| 2,103,687 | 12/1937 | McKenney | 221/94 |
| 2,153,156 | 4/1939 | Pollnow | 222/94 |
| 2,154,393 | 4/1939 | Bates | 221/77 |
| 2,213,846 | 9/1940 | Meyer | 299/88 |
| 2,275,051 | 3/1942 | Maloney | 221/85 |
| 2,275,972 | 3/1942 | Maloney | 221/85 |
| 2,319,244 | 5/1943 | Cascio et al. | 290/83 |
| 2,365,195 | 12/1944 | Holihan | 299/88 |
| 2,456,958 | 12/1948 | Kretschmer et al. | 222/179 |
| 2,465,274 | 3/1949 | Rudd | 299/88 |
| 2,652,952 | 9/1953 | Mowbray | 222/180 |
| 2,665,825 | 1/1954 | Poitras et al. | 222/209 |
| 2,680,010 | 6/1954 | Dubay | 261/124 |
| 2,751,124 | 6/1956 | Jones | 222/179 |
| 2,812,716 | 11/1957 | Gray | 103/37 |
| 2,818,998 | 1/1958 | Jones | 222/179 |
| 2,920,795 | 1/1960 | Piker | 222/131 |
| 2,988,754 | 6/1961 | Misson | 4/182 |
| 3,197,081 | 7/1965 | Midworth | 222/179 |

(List continued on next page.)

FOREIGN PATENT DOCUMENTS

| | | | |
|---|---|---|---|
| 229360 | 3/1923 | Canada . | |
| 414650 | 8/1943 | Canada . | |
| 583961 | 9/1959 | Canada . | |
| 669247 | 8/1963 | Canada | 222/36 |
| 720699 | 11/1965 | Canada | 222/88 |
| 925836 | 5/1973 | Canada | 222/63.1 |
| 999833 | 11/1976 | Canada | 222/76 |
| 1029696 | 4/1978 | Canada | 222/76 |
| 1034096 | 7/1978 | Canada | 222/76 |
| 1059082 | 7/1979 | Canada | 222/76 |
| 1063983 | 10/1979 | Canada | 222/76 |
| 1090748 | 12/1980 | Canada | 222/69.1 |
| 1152380 | 8/1983 | Canada | 222/78 |
| 319068 | 1/1957 | Switzerland . | |
| 209724 | 11/1925 | United Kingdom . | |
| 539418 | 9/1941 | United Kingdom . | |
| 655442 | 7/1951 | United Kingdom . | |
| 953937 | 4/1964 | United Kingdom | 222/209 |
| 1180376 | 2/1970 | United Kingdom . | |
| 1213111 | 11/1970 | United Kingdom | 312/239 |

OTHER PUBLICATIONS

Highland Labs Dispenser, 8/17/78.

*Primary Examiner*—Russell D. Stormer
*Attorney, Agent, or Firm*—Lynn G. Foster

[57] ABSTRACT

This foam dispensing device includes an outer container for holding foamable liquid, and a foam producing unit mounted in the discharge port of the outer container. The foam producing unit includes an inner container of substantial smaller cross section than the outer container, and a closure cap having a pressurized an inlet and foam outlet. A one-way valve is provided between the inner and outer containers which opens to replenish the foamable liquid supply in the inner container but remains closed during the foam forming process.

14 Claims, 1 Drawing Sheet

U.S. PATENT DOCUMENTS

| | | | |
|---|---|---|---|
| 3,203,597 | 8/1965 | Birch | 222/179 |
| 3,233,787 | 2/1966 | Ross | 222/179 |
| 3,308,993 | 3/1967 | Bruno | 222/146 |
| 3,323,689 | 6/1967 | Elmore | 222/385 |
| 3,346,146 | 10/1967 | Thompson | 222/190 |
| 3,422,993 | 1/1969 | Boehm et al. | 222/190 |
| 3,428,222 | 2/1969 | Wright | 222/187 |
| 3,551,076 | 12/1970 | Wilson | 417/385 |
| 3,622,049 | 11/1971 | Thompson | 222/190 |
| 3,709,437 | 1/1973 | Wright | 239/343 |
| 3,824,002 | 7/1974 | Beard | 350/160 |
| 3,935,271 | 10/1976 | Gardner | 222/190 |
| 3,937,364 | 2/1976 | Wright | 222/190 |
| 3,952,924 | 4/1976 | Benson | 222/181 |
| 3,973,701 | 11/1976 | Gardner | 222/190 |
| 4,018,364 | 4/1977 | Wright | 222/190 |
| 4,022,351 | 5/1977 | Wright | 222/145 |
| 4,024,992 | 5/1977 | Schmid | 222/211 |
| 4,027,789 | 6/1977 | Dickey | 222/190 |
| 4,044,923 | 8/1977 | Gardner | 222/190 |
| 4,046,289 | 9/1977 | Teramishi | 222/146 |
| 4,098,434 | 7/1976 | Uhlig | 222/94 |
| 4,147,306 | 4/1979 | Bennett | 239/327 |
| 4,156,505 | 5/1979 | Bennett | 239/327 |
| 4,184,615 | 1/1980 | Wright | 222/190 |
| 4,219,159 | 8/1980 | Wesner | 239/343 |
| 4,274,594 | 6/1981 | Ito | 239/327 |
| 4,327,782 | 5/1982 | McKibben et al. | 141/26 |
| 4,349,129 | 9/1982 | Amneus | 222/41 |
| 4,349,131 | 9/1982 | Arabian | 222/135 |
| 4,350,298 | 9/1982 | Tada | 239/333 |
| 4,531,659 | 7/1985 | Wright | 222/190 |

FOAM DISPENSING DEVICE

Matter enclosed in heavy brackets [ ] appears in the original patent but forms no part of this reissue specification; matter printed in italics indicates the additions made by reissue.

This is a continuation of application Ser. No. 330,254, filed Dec. 14, 1981, now abandoned.

BACKGROUND OF THE INVENTION

This invention relates generally to foam dispensing devices and particularly to a device having an outer container and a relatively small auxiliary inner container filled from the outer container and requiring a smaller air supply to operate.

Several non-aerosol foaming devices have been developed in recent years which are essentially hand-held squeeze bottles of relatively small capacity. Such squeeze bottles, as exemplified by U.S. Pat. No. 3,709,437 and U.S. Pat. No. 3,937,364 work well for their intended purpose but are not readily adapted for use with large containers which are considerably more economical to use. The reason for this is that the control of pressure and foamable liquid capacity is difficult because of the relatively small optimum size of the foam producing components required to produce superior foam quality.

This foam dispenser device provides a means of utilizing foam producing systems, currently limited to use with smaller containers, for use with containers of much greater capacity.

SUMMARY OF THE INVENTION

This foam dispensing device provides a means of using large capacity containers for the production of superior foam by utilizing an inner auxiliary container which is replenished with a foamable liquid supply from the larger container.

The foam dispenser includes an outer container for holding foamable liquid having a discharge port, and a foam producing unit mounted to the container and separating the area adjacent the discharge port and the interior of the container. The foam producing unit includes an inner container disposed within the outer container and having an opening communicating with said outer container; a closure for the inner container having pressurized air inlet means and foam outlet means, foam producing means communicating with the foam outlet means and including an inwardly extending conduit having an opening communicating with the interior of the inner container; and the valve means for the inner container opening, said valve means selectively closing said opening when air pressure within the inner container is increased to supply foamable liquid from the inner container to the conduit of the foam producing means, and said valve means selectively opening said opening when air pressure within the inner container is decreased to permit flow of foamable liquid from the outer container to the inner container.

It is an aspect of this invention to provide a valve means which includes a flexible element selectively opening and closing the inner container opening.

It is another aspect of this invention to provide pump means to supply pressurized air to the air inlet means.

It is still another aspect of this invention to provide a closure which includes a cap having a passage extending therethrough providing the air inlet means, and to provide an inner container formed form a tubular member integrally formed with the closure cap.

It is still another aspect of this invention to provide that the integrally formed inner container and closure cap are received by the outer container discharge port.

DESCRIPTION OF THE PREFERRED EMBODIMENT

Figure 1:
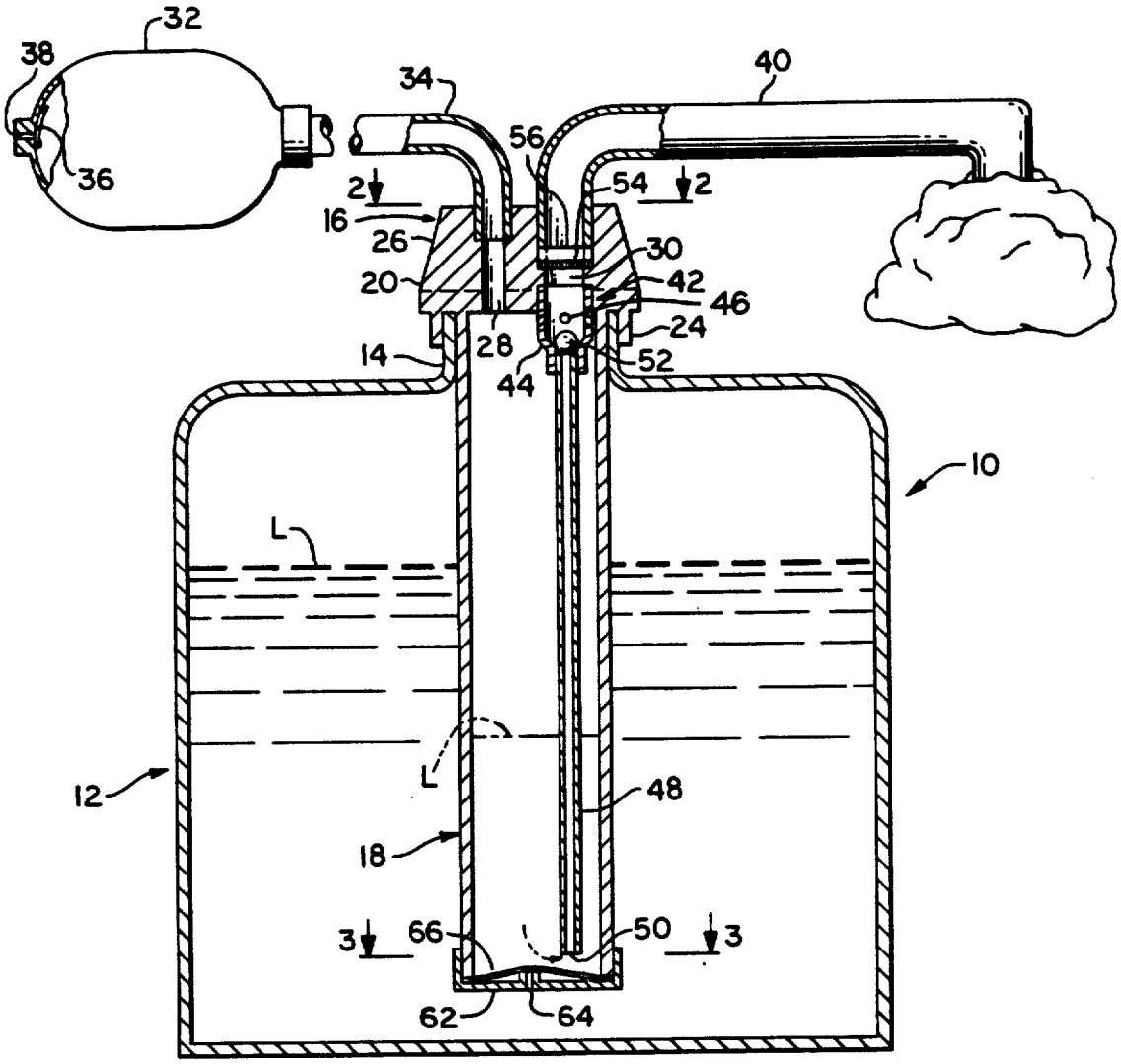
FIG. 1 is a longitudinal sectional view of the device.
Figure 2:
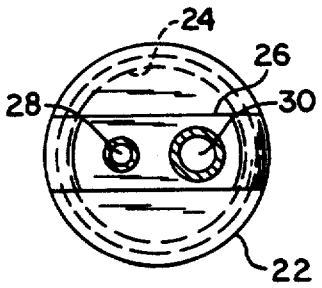
FIG. 2 is a sectional plan view taken on line 2—2 of FIG. 1.
Figure 3:
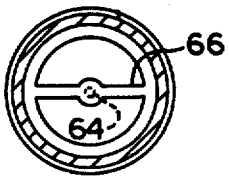
FIG. 3 is a sectional plan view taken on line 3—3 of FIG. 1.

Referring now by reference numerals to the drawing and first to FIG. 1 it will be understood that the foam dispensing device, generally indicated by numeral 10, includes an outer container 12 having a neck portion 14 defining a discharge port. The device also includes a foam producing unit 16 mounted within the neck of the container 12 and separating the area adjacent the discharge port and the interior of the container.

The container 12 provides a reservoir for foamable liquid generally indicated by L and may be formed from any suitable rigid or non-rigid material such as metal or plastic.

The foam producing unit 16 includes a tubular member 18, of rigid plastic or the like providing an auxiliary inner container disposed within the outer container 12 and a closure cap 20.

The closure cap 20 includes a base portion 22, a depending annular ring 24 and an outwardly projecting portion 26. The closure cap 20 also includes a passage 28 extending therethrough and providing a pressurized air inlet means into the tubular member 18 and a passage 30 extending therethrough and providing a foam outlet means from the tubular member 18.

In the embodiment shown, pressurized air is supplied to the air inlet passage 28, as by a bulb 32 connected to the passage 28 by a connecting tubular member 34. As shown in FIG. 1, the bulb 32 includes a one-way valve such as provided by the diaphragm 36 covering the bulb air inlet passage 38. However, it will be understood that other pressurized air producing means, such as a foot pump, could be used in place of a bulb.

The foam inlet passage 30 is fitted at its upper end with a tubular member 40 which, in effect, provides an extension to said foam outlet passage. As shown, the passage 30 also provides a mounting for a foam producing means generally indicated by numeral 42, which communicates with the tubular member 40.

The foam producing means 42, in the embodiment shown, is similar to that disclosed in U.S. Pat. No. 3,709,437 in that it includes a downwardly depending hollow element 44 having air passages 46 disposed thereabout, and providing a foam producing mixing chamber. An elongate tubular member 48, providing an inwardly extending conduit means, is attached to the hollow element 44 and communicates with said element at its upper end. The tubular member 48 also includes an opening 50 at its lower end. The air passages 46 provide for the introduction of air into the mixing chamber formed by member 44 at the same time that foamable liquid is introduced into said mixing chamber by the tubular member 48. The cross section of the air passage 46 is such that free flow of air therethrough is restricted causing air pressure acting upon the upper surface of the foamable liquid to force the foamable liquid upwardly through the tubular member 48 and into the mixing chamber. Simultaneous introduction of air and foamable liquid affects the intermixing of liquid and air to produce foam. In the embodiment shown, a ball check valve 52 is provided for the mixing chamber which seats with a reduced portion of the hollow element 44 to prevent the return of foam into the tubular member 48. Passage 30 is configured to provide a seat for a beam homogenizing overlay element 54 which is held in place by means of a retainer 56. It will be understood that other foam producing means could be used if desired such as the disclosed in U.S. Pat. No. 3,397,364.

Figure 4:
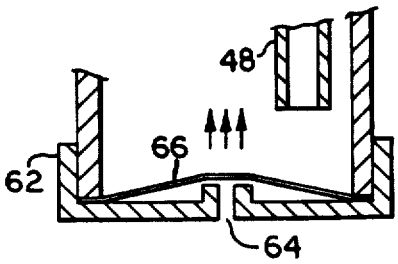
FIG. 4 is an enlarged view illustrating the valve action.

The tubular member 18, in the embodiment shown, is integrally formed with the closure cap 20. An inner cap 62 providing an inner end wall is also provided, said cap 62 having an end opening 64 therein communicating with the outer container 12. One-way valve means, in the form of a flexible element 66 of rubber or the like, is provided for the opening 64 and is held in place by the end cap 62. The valve means is selectively closed, as shown in FIG. 1, when air pressure within the inner container 60 is increased by applying pressure to the bulb 32, so that the flexible element 66 is urged against the opening 64 and air pressure forces liquid L down the tubular member 18 to L', with the result that foamable liquid L is supplied, by way of the tubular member 48, to the foam producing means 42. When the air pressure is relieved, the valve means is selectively opened, as shown in FIG. 4, by lifting flexible element 66 away from the opening 64 to permit flow of the foamable liquid from the outer container 12 to the inner container 18. Of course, if desired, a ball valve or other form of one-way valve could be used in lieu of the flexible element 66.

When the foam producing unit 16 is initially inserted into the outer container 12 containing foamable liquid L, the flexible element 66 is opened to admit liquid into the inner container by virtue of the pressure differential resulting from the difference in liquid levels between the inner and outer containers. When the foam producing unit 16 is fully installed and the liquid levels are equal and foam is produced by simply applying pressure to the surface of the liquid L in the inner container tending to lower the level in said container to the point indicated by L'. Release pressure again causes liquid L to enter the inner container, such entry being assisted by the relative negative pressure inside the container 18 resulting from the release of the bulb 32.

Essentially, the use of a valved inner container of a substantially smaller volume than that of the other container provides the advantage that a large container can produce foam effectively with the application of air pressure to a relatively small auxiliary container which requires less air to produce the necessary pressure to form the foam thereby permitting rapid foaming action with a relatively small air pressure actuating means. Good results have been obtained using an outer container and inner container having cross-sectional areas proportions of between fifty-to-one (50:1) and one hundred-to-one (100:1) based on an inner container diameter of one inch (1").

I claim:

1. A foam dispenser device, comprising (a) an outer *large* container, for holding *a substantially enlarged quantity of* foamable liquid, having a [discharge] port, [and]

(b) *foam outlet means,*

(c) a foam producing unit mounted to the container and separating the area adjacent the [discharge] *outer container* port and the interior of the container, said [form] *foam* producing unit including;

1. an [inner] *small* container disposed within the outer container, and having an opening communicating with said outer container,
2. a closure for the [inner] *small* container having pressurized air inlet means communicating [with] *air under positive pressure to* the [inner] *interior of the small* container [and foam outlet means] *but not to the interior of the outer container,*
3. foam producing means communicating [with] *foam to* the foam outlet means, said foam producing means including air-receiving means communicating with the air inlet means to receive pressurized air and liquid-receiving means including an inwardly extending conduit having an opening communicating with the interior of the [inner] *small* container to receive liquid,
4. valve means for the inner container opening, said valve means selectively closing said opening when air pressure within the [inner] *small* container is increased, to supply foamable liquid from the [inner] *small* container to the conduit of the foam producing means, said valve means selectively opening said opening when air pressure within the [inner] *small* container is decreased to permit flow of foamable liquid from the outer container to the [inner] *small* container, and

[(c) a] *(d)* pump means supplying pressurized air to the air inlet means, said pump means including an opening communicating with ambience and valve means selectively closing said opening when air pressure within the pump means is increased and selectively opening said opening when air pressure within the opening is decreased to admit air into said pump means.

2. A foam dispenser device as defined in claim 1, in which

[(d)] *(e)* the means in the foam-producing means receiving air includes at least one opening disposed intermediate the conduit opening at the lower end of the [inner] *small* container and the foam outlet means permitting air flow into said conduit.

3. A foam dispenser device as defined in claim 1, in which

[(d)] *(e)* the closure includes a cap having a passage extending therethrough providing the air inlet means, and

[(e)] *(f)* the [inner] *small* container includes a tubular member integrally formed with the closure cap.

4. A foam dispenser device as defined in claim 3, in which

[(f)] *(g)* the integrally formed [inner] *small* container tubular member and closure cap are received by the outer container [discharge] port.

*5. A foam dispensing device having a substantially enlarged liquid capacity comprising:*

*a large reservoir for long-term storage and periodic use of a substantially enlarged quantity of foamable liquid;*

*a small reservoir for selective receipt, as a stream, and short-term storage of a small quantity of foamable liquid displaced from the large reservoir;*

*one way passage fluid path-defining means accommodating low velocity flow of said small quantity of foamable liquid from the large to the small reservoir at successive points in time while preventing fluid flow from the small to the large reservoir;*

*foam-producing means juxtaposed the two reservoirs;*

*manually operable air pump means selectively used to place the air under pressure above atmospheric pressure;*

*air flow path-defining means interposed between the air pump means and the foam-producing means;*

*means by which the pressure from the air pump means is selectively exerted upon the small quantity of foamable liquid contained in the small reservoir;*

*liquid flow path-defining means interposed between the small reservoir and the foam-producing means;*

*the foam-producing means comprising means causing a confluence of air flowing along the air flow path-defining means and foamable liquid flowing along the liquid flow path-defining means thereby causing entrainment of air within the liquid to produce foam;*

*foam effluent means interposed between the foam-producing means and the atmosphere along which foam is slowly extruded responsive to the confluent displacement of air and foamable liquid at the foam-producing means.*

*6. A foam dispensing device according to claim 5 wherein the foam-producing means are carried by cap means mounted to the top of the large reservoir.*

*7. A method for repeatedly dispensing small quantities of foam formed by entraining air within a foamable liquid in a device successively over an extended period of time without need to replenish the supply of foamable liquid in the device, comprising the steps of:*

*storing a substantially enlarged quantity of foamable liquid in a large container;*

*transferring a small quantity of foamable liquid at a slow rate from the large container along a one way fluid flow path to a small chamber;*

*selectively applying the force of manually-derived positive pressure to the small quantity of foamable liquid in the small chamber to displace at least a substantial portion of the small quantity of foamable liquid from the small chamber to a foam-producing site as a low velocity liquid stream;*

*delivering a stream of air under said manually-derived positive pressure to the foam-producing site;*

*causing a confluence at the foam-producing site by continuously merging the stream of foamable liquid and the stream of air under force of said manually-derived positive pressure to produce foam at the foam-producing site;*

*displacing foam at a low velocity along an effluent foam flow path from the foam-producing site to an output site.*

*8. A foam-dispensing device having a substantially enlarged liquid capacity comprising:*

*a large container for holding a large supply of foamable liquid to be periodically used in small increments over an extended time;*

*a small chamber for successively receiving at selected points in time over said entire extended period of time said increments of foamable liquid from the large container;*

*one-way fluid flow means by which each small increment of foamable liquid is selectively delivered via low velocity flow from the large container to the small chamber;*

*foam-producing means comprising air inlet means, foamable liquid influent means and foam effluent means;*

*a source of manually-derived pressure;*

*foamable liquid passageway means interposed between the small chamber and the foamable liquid influent means of the foam-producing means by which at least a substantial portion of each increment of foamable liquid from the small chamber is selectively delivered to the foam-producing means under low velocity;*

*means by which the force of positive pressure selectively manually derived from said source is imposed upon the small increment of foamable liquid in the small chamber at a desired point in time thereby forcing said low velocity flow of the foamable liquid from the small chamber to the foam-producing means;*

*means by which air under said positive pressure is delivered to the air inlet means of the foam-producing means causing the air to be entrained within the flowing foamable liquid at the foam-producing means to produce foam, the foam thereafter issuing from the foam effluent means of the foam-producing means and thence at low velocity along a foam discharge passageway to a foam discharge port;*

*means by which the force of the manually-derived positive pressure is at all times isolated from the interior of the large container.*

*9. A foam-dispensing unit according to claim 8 wherein negative pressure is imposed upon the interior of the small chamber to stimulate delivery of each additional small increment of foamable liquid from the large container to the small chamber following but not during selective displacement of any small increment of foamable liquid from the small chamber to the foam-producing means.*

*10. A foam-dispensing unit according to claim 8 wherein the foam discharge passageway extends in a substantially horizontal direction.*

*11. A foamer operable under manually-derived pressure comprising:*

*an extraordinarily large supply of foamable liquid disposed in a large container;*

*a small pump chamber;*

*one-way flow control means by which relatively small amounts of foamable liquid are successively displaced from the large container to the small chamber when foam is not being produced;*

*a manually-operated pressure pump;*

*foam-producing structure;*

*foamable liquid flow path means interposed between the small chamber and the foam-producing structure;*

*means isolating the force of the positive pressure created by the pump from the interior of the large container;*

*means imposing the force of the positive pressure created by the air pump upon the small amount of foamable liquid in the small chamber thereby displacing the same at low velocity from the small chamber along the foamable liquid flow path means to the foam-producing structure;*

*means accommodating simultaneous delivery of air under positive pressure derived from the pump to the foam-producing structure where the air is continu-*

*ously entrained within the small amount of foamable liquid flowing into the foam-producing structure;*

*foam effluent means along which the foam is discharged from the foam-producing structure to the user.*

*12. A method by which foam is dispensed under manually-derived pressure, comprising the steps of:*

*placing a very large supply of foamable liquid in a large container, the quantity of foamable liquid substantially exceeding that which could heretofore be operatively used;*

*causing a relatively small amount of said foamable liquid to be selectively displaced at successive desired points in time from the large container to a relatively small adjacent chamber;*

*selectively manually placing air under positive pressure and imposing the force of said positive pressure upon the small amount of foamable liquid in the small chamber while preventing the force of the positive pressure from being imposed upon the foamable liquid in the large container, thereby forcing flow of foamable liquid only from the small chamber at a slow rate to a foam-producing site where air under said positive pressure is entrained within the flowing foamable liquid to foam said flowing foamable liquid at the foam-producing site, the foam being extruded at a slow rate from the foam-producing site to a foam discharge site.*

*13. A method according to claim 12 further comprising the step of applying negative pressure to the interior of the small container to stimulate successive delivery thereto of each small amount of foamable liquid from the large container following but not during selective delivery of foamable liquid from the small chamber to the foam-producing site.*

*14. A foamer from which foam is periodically dispensed under manually-derived pressure comprising:*

*a very large container in which a very large supply of foamable liquid is placed, the quantity of foamable liquid substantially exceeding that which could heretofore be operatively used;*

*a relatively small chamber;*

*one-way flow means through which a relatively small amount of said foamable liquid is selectively displaced from the large container to the small chamber at successive desired points in time following dispensing of foam;*

*a source of pressure selectively manually operated to place air under positive pressure;*

*means imposing the force of said positive pressure upon the small amount of foamable liquid in the small chamber;*

*means preventing the force of the positive pressure from being imposed upon the foamable liquid in the large container;*

*foam-producing means;*

*foamable liquid flow path means along which foamable liquid from the small container is displaced at a slow rate to the foam-producing means;*

*means by which air under said positive pressure is delivered to the foam-producing means and entrained within the foamable liquid to continuously foam said flowing foamable liquid at the foam-producing means;*

*foam effluent means interposed between the foam-producing means and a foam discharge port along which the foam generated at the foam-producing means is extruded at a slow rate.*

* * * * *